Nov. 17, 1964    T. J. PACHELL    3,157,292
BILLET UNSCRAMBLER
Filed Sept. 10, 1962    3 Sheets-Sheet 1
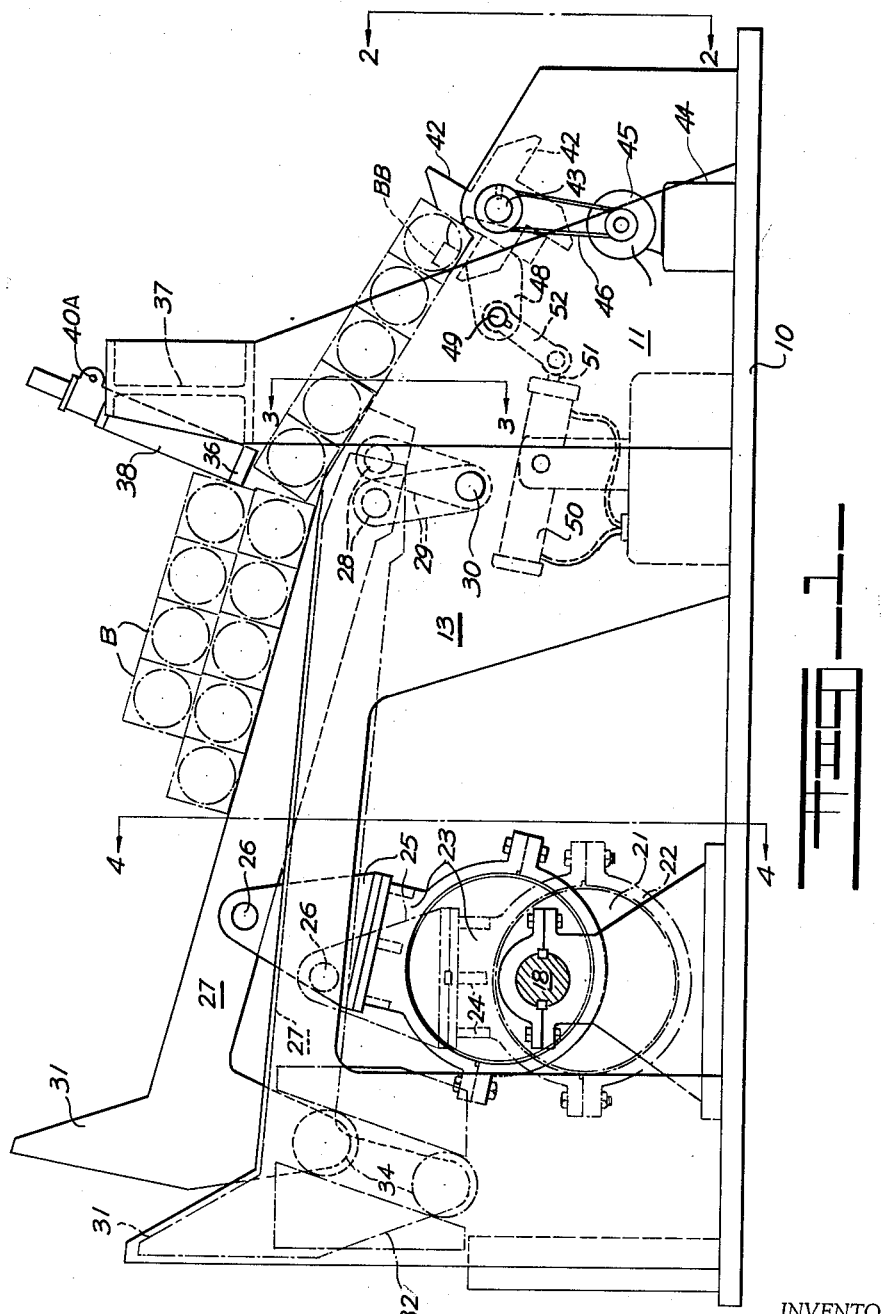
INVENTOR.
Thomas J. Pachell
BY
ATTORNEY.

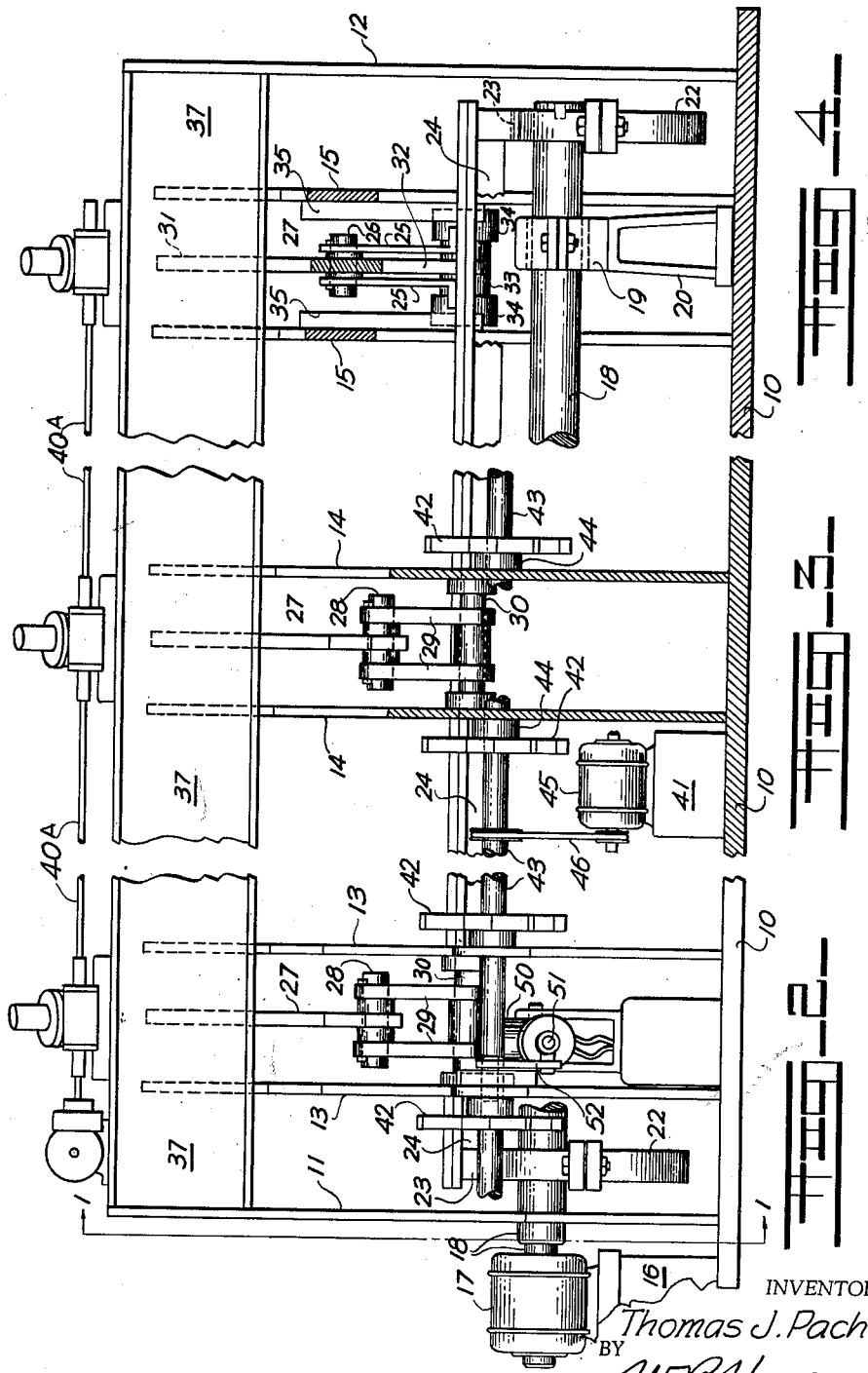

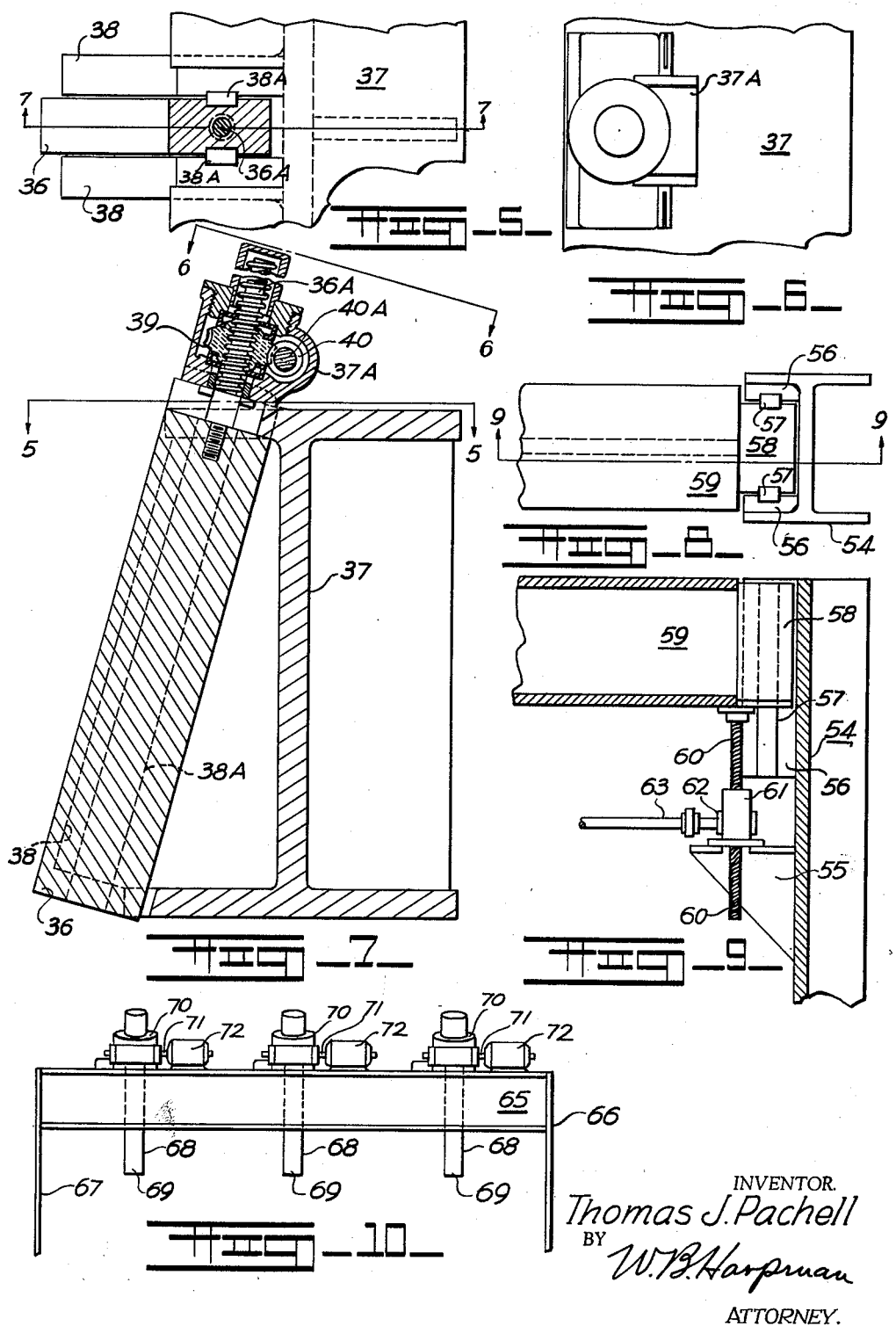

United States Patent Office 3,157,292
Patented Nov. 17, 1964

3,157,292
BILLET UNSCRAMBLER
Thomas J. Pachell, 3519 Kirk Road, Youngstown, Ohio
Filed Sept. 10, 1962, Ser. No. 222,569
6 Claims. (Cl. 214—1)

This invention relates to apparatus for handling billets or bars as found in the metal working industries and including billets and bars of various metals, such as steel and aluminum and which billets and bars are processed or formed from ingots and eventually processed or formed into bars, rods, pipe, wire tubing and other structural shapes, etc.

In particular, the invention relates to a billet unscrambler which is adapted to receive a quantity of billets or bars from an ingot reducing area as by way of an overhead crane or fork-lift truck or the like and whereby the billets or bars may be separated or unscrambled and presented one at a time to an inspection and conditioning area.

The principal object of the invention is the provision of a billet or bar unscrambler which will receive a quantity of billets or bars, separate the same and deliver one of a time in a predetermined desirable position.

A further object of the invention is the provision of a billet or bar unscrambler which occupies a relatively small amount of floor space and is complete in that it is not dependent upon a crane or personnel or other means to correct faulty operation of billet or bar jams as may occur.

A still further object of the invention is the provision of a billet or bar unscrambler which will consistently feed one billet or bar at a time and which can be operated to feed billets or bars at a desired speed and which device can be incorporated into an automated processing facility.

A still further object of the invention is the provision of a billet or bar unscrambler in which the relative size of the billets or bars being handled may be readily and quickly changed by the operator and by remote control means.

A still further object of the invention is the provision of a billet or bar unscrambler which incorporates on oscillating or walking beam type of feeding table arranged to avoid jamming of the billets or bars and wherein the oscillating or walking beam type of feed assembly is angularly inclined so as to utilize a gravity feed motion as well as a walking beam mechanical motion or a magnetic conveyer as desired.

A still further object of the invention is the provision of a billet or bar unscrambler which provides motion suitable for overcoming the frictional engagement of the billets or bars positioned thereon and thereby freeing them and delivering them one at a time from the unscrambler.

The billet or bar unscrambler disclosed herein is of particular interest in the metal working industry wherein billets or bars which have been rolled from ingots are delivered in the form of bundles or other quantities by an overhead crane or fork-lift truck or the like to billet or bar inspection and conditioning area. Those skilled in the art will be familiar with the fact that at this stage of the processing of the billets or bars, the same are delivered individually to inspection and conditioning conveyers or tables where surface defects are removed by flame scarfing chipping or grinding and the present invention relates to a device which will receive such quantities of billets and deliver them to such an inspection and conditioning area automatically, uniformly and without jamming or other time and labor consuming delays. Those skilled in the art will be familiar with the fact that after such inspection and scarfing, chipping or grinding as may be required, the billets or bars are processed on other equipment to their finished shapes as by rolling, drawing and extruding, forging or other known forming processes.

Heretofore, billet or bar unscramblers have been proposed and have been used in the metal working industry, but they have uniformly failed to achieve their intended action in receiving, unscrambling, sorting, selecting and delivering an individual billet or bar at a desired time and place and the present invention therefore has as one of its other objects the provision of a billet or bar unscrambler which will accomplish this result.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a side elevation of the billet or bar unscrambler with broken lines showing a portion of the device in an alternate position.

FIGURE 2 is a front view of a portion of the device seen in FIGURE 1.

FIGURE 3 is a front view of an adjacent portion of the device seen in FIGURES 1 and 2.

FIGURE 4 is a front view of an adjacent portion of the device seen in FIGURES 1, 2 and 3.

FIGURE 5 is an enlarged top plan view of a portion of the machine seen in FIGURES 1, 2, 3 and 4, and taken on line 5—5 of FIGURE 7.

FIGURE 6 is a top plan view of a portion of the machine seen in FIGURES 1, 2, 3 and 4 and taken on line 6—6 of FIGURE 7.

FIGURE 7 is a cross section on line 7—7 of FIGURE 5.

FIGURE 8 is a top plan view of a modification of the device.

FIGURE 9 is a vertical section on line 9—9 of FIGURE 8.

FIGURE 10 is a front elevational view of a further modification showing the machine in smaller detail and wherein each of the several vertically adjustable members are individually actuated.

By referring to the drawings and FIGURES 1, 2, 3 and 4 of the drawings in particular, it will be seen that the billet or bar unscrambler comprises a base 10 and a plurality of vertically positioned horizontally spaced frame members two of which indicated by the numerals 11 and 12 respectively comprise end frame members and the intermediate ones of which are indicated by the numerals 13, 13; 14, 14 and 15, 15 and comprise spaced pairs of secondary frame members. It will be observed that the end frame members 11 and 12 and the secondary frame members 13, 13; 14, 14 and 15, 15 are all secured to the base 10 and that at the extreme left end of the machine as seen in FIGURE 2, a motor stand 16 is positioned on the base 10 with an electric motor 17 which preferably incorporates a gear reduction unit integrally therewith mounted thereon and arranged to drive a drive shaft 18 which extends transversely of the device through each of the spaced pairs of frame members 13, 13; 14, 14 and 15, 15 and terminates inwardly of the opposite end frame member 12 as seen in FIGURE 4 of the drawings.

As will be observed by referring to FIGURE 1 of the drawings, FIGURES 2, 3 and 4 are taken at three different locations on the machine; FIGURE 2 being taken in the foremost position; FIGURE 3 being taken inwardly or rearwardly therefrom and FIGURE 4 being taken inwardly or rearwardly relative to FIGURE 3. The main drive shaft 18 is supported on bearings 19 which are in turn positioned on the upper end of bearing support stands 20 and the bearing support stands 20 in turn rest on the base 10. Several of such bearing assemblies 19 are present in the machine to support the shaft 18 as will be understood by those skilled in the art.

The main drive shaft 18 has a plurality of cams 21, 21 in the form of discs positioned in off-center relation to or eccentrically on said main drive shaft 18 and which cams 21, 21 will therefore revolve uniformly with the drive shaft 18 in an eccentric motion relative thereto. Annular frames are slidably engaged on the peripheries of each of the cams 21 and comprise cam followers 22, 22 having upstanding portions 23, 23 which support a horizontally disposed longitudinal frame member 24 having a horizontal flange on its upper most surface and which frame member 24 has a plurality of upstanding horizontally spaced apertured arms 25, 25 thereon arranged in pairs as best seen in FIGURES 2 and 3 of the drawings and which pair of apertured arms 25, 25 have pivot pins 26, 26 positioned therebetween each of which is in turn pivotally engaged inwardly of the ends of each of a plurality of oscillating members 27, 27.

The front ends of the oscillating members 27, 27 (the right hand ends as seen in FIGURE 1) have transverse pivot pins 28, 28 positioned therethrough which in turn are engaged in the upper apertured ends of pairs of spaced secondary arms 29, 29 as best seen in FIGURES 2 and 3 of the drawings and as seen in broken lines in FIGURE 1 of the drawings. The lower ends of the secondary arms 29 are pivoted on a transverse shaft 30 which extends between each of the pairs of secondary frame members 13, 13; 14, 14 and 15, 15. The rearmost ends of each of the oscillating members 27 comprises an elongated angularly disposed member having an upstanding portion 31, and a depending portion 32 with a transverse shaft 33 positioned therethrough and which transverse shaft 33 has a pair of rollers 34, 34 on its outermost ends as best seen in FIGURE 4 of the drawings and also in broken lines in FIGURE 1 of the drawings.

The rollers 34, 34 are engaged between spaced inclined tracks 35, 35 secured to the inner opposed surfaces of each of the secondary frame members 13, 13; 14, 14 and 15, 15. By referring now to FIGURE 1 of the drawings, it will be observed that when the drive shaft 18 is rotated, the cams 21, 21 will revolve with the cam followers 22, 22 describing an eccentric action and inasmuch as the uppermost ends thereof are pivoted to the pivot pins 26, 26 which in turn are pivoted to the oscillating members 27, 27 the movement is largely vertical. Thus, the net result of the rotary motion of the shaft 18 is to impart alternate generally up and down motion to the oscillating members 27 and this up and down motion is modified by the eccentric motion of the cam arrangements and their followers so that the oscillating members 27, 27 move upwardly and downwardly and forwardly and backwardly as seen in FIGURE 1 of the drawings wherein broken lines show the oscillating members 27 in lowermost position and solid lines show them in uppermost position. It will be understood that this motion is uniformly imparted to each of the plurality of oscillating members 27 and that while three such oscillating members 27 are shown in the present disclosure, as many such members as may be required for the width of the machine may be employed, and that each oscillating member 27 is positioned between a pair of secondary frame members.

It will be observed that the uppermost portions of each of the horizontally spaced pairs of vertically standing secondary frame members 13, 13; 14, 14 and 15, 15 are shaped as best seen in FIGURE 1 of the drawings so that they conform with the uppermost surface of the oscillating members 27, 27 and are positioned so that when the oscillating members 27, 27 are in lowermost position, they lie below the uppermost surfaces of the pairs of secondary frame members 13, 13; 14, 14 and 15, 15.

Bar or billets as shown in broken lines and indicated by the letter B are positioned in bundles or groups on the uppermost surface of the device which, depending upon the position of the oscillating member 27, will either comprise their upper most surfaces or the uppermost surfaces of the secondary frame members 13, 13; 14, 14 and 15, 15 as hereinbefore described and that when the drive shaft 18 is revolved by the motor 17 the resulting action will be the oscillating motion of the members 27 and the walking beam action which is mechanically imparted thereby to the bars or billets B which will move them into unscrambled relation and line them up transversely of the device where they will tend to move to the right thereof, toward the front thereof as seen in FIGURE 1 of the drawings and into engagement with a plurality of vertically adjustable blocking members 36, 36 which in turn are carried in transversely spaced relation on an elongated transversely positioned I-beam 37 which in turn is carried by the end frame members 11 and 12 respectively and extends completely across the machine and all of the parts thereof therebetween. This is illustrated in the composite illustration comprising FIGURES 2, 3 and 4 and in enlarged detail in FIGURE 7.

In the preferred embodiment of the invention, the I-beam 37 is fixed relative to the end frame members 11 and 12 and the blocking members 36, 36 are vertically adjustable relative thereto as seen in FIGURES 1 through 4 of the drawings and in enlarged detail in FIGURES 5, 6 and 7 of the drawings. By referring thereto, it will be seen that the I-beam 37 has a plurality of angularly positioned guide channels 38, 38 secured thereto with the vertically adjustable members 36, 36 positioned between each of said pairs of guide channels 38, 38 by means of elongated inserts 38A, 38A, and movable vertically relative thereto by vertically extending threaded extensions 36A, 36A each of which is engaged in a caged threaded member 39 as best seen in the cross section comprising FIGURE 7 of the drawings. The outermost portions of each of the threaded members 39, 39 are provided with gear patterns arranged to engage worm gears 40, 40 positioned in suitable journals 37A, 37A comprising the upper most portions of the guide members 38, 38 and carried by the I-beam 37. Each of the worm gears 40 is secured to or may be part of a transversely extending horizontally positioned shaft 40A which may extend completely across the top of the I-beam 37 longitudinally thereof as seen in the composite view comprising FIGURES 2, 3 and 4 of the drawings, or it may alternately comprise only a short shaft coupled to an adjacently located source of motion such as an electric motor 72 as seen in the modification comprising FIGURE 10 of the drawings and hereinafter described. In either event, rotation of the shaft 40A or its equivalent shaft 71 as seen in FIGURE 10 of the drawings will result in vertical motion of the guide members 36, 36 and thereby vary their effective height and positions relative to the I-beam 37 on which they are supported and relative to the forward end sections of the oscillating members 27, 27 as seen in FIGURE 1 of the drawings.

As illustrated in FIGURE 1 of the drawings, the guide members 36, 36 are lowered slightly with respect to the lower surface of the I-beam 37 and thereby spaced with respect to the upper surfaces of the ends of the oscillating members 27, 27 and which ends are inclined at an angle relative to the remainder thereof so that billets B of a height capable of passing beneath the guide members 36, 36 may be handled by the machine while billets of a great height will not be permitted to pass, and billets B piled more than one row high will be withheld as illustrated in broken lines in FIGURE 1 of the drawings. Billets B thus passing between the vertically adjustable guide members 36, 36 and the upper surfaces of the forward ends of the oscillating members 27, 27 will be transversely aligned with the transverse axis of the machine and/or the I-beam 37 and will slide down the increased angle of the upper forward surfaces of the pairs of secondary frame members 13, 13; 14, 14 and 15, 15 as shown in FIGURE 1 of the drawings until they engage a plurality of restraining members 42, 42 which have radially extending circumferentially spaced arms and which members 42, 42 are secured to a shaft 43 which in turn is journalled in suitable bearings 44, 44 secured to the sides of the secondary frame members 13, 13; 14, 14 and 15, 15 respectively as best seen in FIGURES 1, 2 and 3 of the drawings. These restraining members 42, 42 on the shaft 43 are provided with means for permitting the simultaneous partial rotation thereof and such means is illustrated in FIGURES 1 and 3 of the drawings as comprising a stand 41, a secondary electric motor and gear reduction unit 45 and a chain drive 46 driven thereby and engaged upon a sprocket on the shaft 43. The secondary electric motor 45 is subject to the control of the operator of the device and arranged so that it provides one quarter rotation of the shaft 43 on each operation thereby causing the arms of the restraining members to pick up one of the billets or bars B and deliver it to the front end of the machine, that is, to the righthand portion as seen in FIGURE 1 of the drawings.

It will occur to those skilled in the art that at such time as relatively small billets or bars are handled by the device, it will be advisable to provide auxiliary means for elevating the smaller billets or bars simultaneously with the rotary operation of the arms of the restraining members 42, 42 about the shaft 43 and by referring to FIGURES 1 and 2 of the drawings, such means may be seen as comprising spacer members 48, 48 pivoted on shafts 49, 49 extending between the secondary frame members (14 and 15 in FIGURES 1 and 2) and arranged to move into position so as to space a small billet outwardly from the center of the adjacent member 42, 42 so that the ends of the arms of said members 42, 42 will then engage the smaller billet and move it upwardly over the pivoted spacer members 48, 48 so that it can be effectively delivered from the front of the machine as in the case of a larger billet. By referring to FIGURE 1 of the drawings, a small billet BB is indicated by broken lines and shown in position against the upper projecting end of the arms of the spacing member 48, 48 and it will be seen that when the shaft 43 revolves and the members 42, 42 rotate clockwise the smaller billet or bar BB will follow a path guided largely by the spacer members 48, 48. Means for moving the spacer members 48, 48 into and out of position adjacent each of the members 42, 42 comprise a pneumatic piston and cylinder assembly in which a piston rod 51 is connected to a lever 52 which in turn is secured to the spacer member 48 and acts to move the same in a partial pivoting action based on the shaft 49 heretofore referred to. These spacing member units are under the control of the operator and are used when the smaller billets or bars BB are being handled by the machine. At such time it will be obvious that the guide members 36 will have been lowered to permit only such smaller bars or billets BB to pass therebelow as heretofore described.

Modifications in the billet or bar unscrambler as disclosed herein will be obvious to those skilled in the art and one such modification resides in the substitution of a horizontally disposed uniformly vertically adjustable member 59 for the fixed I-beam 37 and by referring to FIGURES 8 and 9 of the drawings such a modification may be seen in partial top plan and partial cross sectional elevations. In FIGURE 9 of the drawings, one end frame 54 of a modified billet unscrambler may be seen and which end frame will correspond with the end frame 12 heretofore described in connection with FIGURE 4 of the drawings, the end frame 54 being provided with an inwardly extending support bracket 55 and a pair of vertical guide members 56, 56 in which vertically positioned oppositely disposed elongated inserts 57, 57 formed on the end 58 of the adjustable member or beam 59 are slidably positioned. A vertical screw 60 is positioned under each end of the adjustable member 59, only one end being shown in FIGURES 8 and 9, and is rotatably positioned in a housing 61 in which a rotatable gear and worm gear assembly 62 is positioned and adapted to be driven by a drive shaft 63, just as in the description of FIGURE 7 of the drawings. The drive shaft extends transversely of the machine from one side to the other so that appropriate motion imparted thereto by a motor (not shown) will cause the entire adjustable member to move vertically as desired by the operator.

It will thus be seen that in the modification herein described and disclosed in FIGURES 8 and 9 of the drawings an individual transverse adjustable member 59 is substituted for the several vertically adjustable members 36 positioned on the transverse stationary beam 37 of the disclosure as seen in the other figures of the drawings.

FIGURE 10 of the drawings shows a further modification as previously mentioned herein and with respect to the adjustable members 36 which were disclosed in FIGURES 1 through 7 as being operated uniformly by the shaft 40A and which shaft 40A extended parallel with the supporting beam 37. In FIGURE 10, a supporting beam 65 supported on end frame members 66 and 67 has a plurality of vertically positioned guide members 68, 68 each pair of which has a vertically movable adjustable member 69 therebetween, and a gear housing 70, 70 at its uppermost end in which an assembly exactly like that heretofore described in connection with FIGURES 5, 6 and 7 of the drawings is located. In the modification of FIGURE 10, the shaft 40A as used in the form of the invention heretofore described in connection with FIGURES 2 through 7 of the drawings is dispensed with and individual shafts 71, 71 and individual motor and gear reduction nuts 72, 72 are substituted. Thus, an operator can move one or more of the adjustable members 69 to facilitate the clearing of a jamming operation if this would be desirable whereas in the preferred embodiment of the invention all of the adjustable members 36, 36 move simultaneously by reason of their interconnection by the single drive shaft 40A.

It will thus be seen that a billet or bar unscrambler has been disclosed which utilizes a unique means of receiving, moving, classifying and sorting bars or billets and delivers the same under the control of the operator to further processing equipment as will be understood by those skilled in the art. It will also occur to those skilled in the art that the worm gear screw jack construction utilized in the actuating of the individual adjustable members 36 and hereinbefore described could obviously be changed to an hydraulic or pneumatic piston and cylinder operated construction without departing from the spirit of the invention and that a motor-driven mechanical linkage could be utilized to effect the same operation.

The present invention will permit one-man operation and completely frees the billet or bar unscrambling operation common in metal working plants from the reliance on a group of men and a crane as has heretofore been customary which will obviously result in savings in operating costs. In further modifying the invention, the particular walking beam construction disclosed herein which is mechanical could be altered to a magnetic conveyer with a minimum of change and with all of the advantages and the present invention still present therein, and it will further occur to those skilled in the art that an electrical switch or switches in the area of the restraining members 42, 42 can supervise the control of the walking beam drive means so that so long as a billet is engaged against the arms of the restraining members 42, 42 the walking beam or drive means energizing the same can be temporarily inoperative.

It will thus be seen that a billet or bar unscrambler meeting the several objects of the invention has been disclosed and having thus described my invention, what I claim is:

1. In a billet or bar unscrambler having a plurality of spaced inclined frame members for receiving said billets or bars, spaced inclined tracks on said frame members adjacent one end thereof, a plurality of elongated inclined oscillating members movably positioned therebetween, an arm pivoted to one end of each of said oscillating members, the other end of said arm being pivoted to said frame, vertical extensions on the opposite end of each of said oscillating members, rollers on said vertical extensions engaged between said inclined tracks and eccentric devices engaging said oscillating members for imparting oscillating motion thereto and blocking means spaced above said first mentioned ends of said oscillating members and defining a passageway for said billets or bars.

2. The billet or bar unscrambler set forth in claim 1 and wherein the ends of said oscillating members beneath said blocking means are tapered downwardly.

3. The billet or bar unscrambler set forth in claim 1 and wherein said blocking means comprises a transverse beam and a plurality of horizontally spaced depending members thereon.

4. The billet or bar unscrambler set forth in claim 1 and wherein the blocking means vertically spaced with respect to the upper surface of the frame members comprises a transversely extending beam, a plurality of guide channels secured thereto and a plurality of vertically movable guide members slidably engaged in said guide channels and means on said beam for imparting uniform vertical motion to said guide members.

5. The billet or bar unscrambler set forth in claim 1 and wherein said plurality of inclined oscillating members and said spaced inclined frame members have their forward end portions inclined at a relatively greater angle than their rearward portions and wherein said blocking means is disposed above said forward end portions adjacent the portions of greater inclination.

6. In a billet or bar unscrambler having a base, end frames at either side of said base and a plurality of pairs of secondary frames positioned in transversely spaced relation therebetween, the upper surfaces of said pairs of secondary frames being inclined from the rear to the front of the said machine, a vertically movable blocking member positioned transversely of the machine and spaced above said inclined upper surfaces of said secondary frame members, arms pivoted to said secondary frame members, a plurality of conveyer members having their front ends pivoted to said arms and arranged thereabove for substantially horizontal motion at said pivoted ends, an eccentric mechanism, vertical extensions of said mechanism pivotally engaging each of said conveyer members inwardly from their rearmost end portions for imparting oscillating motion thereto and inclined tracks on said secondary frames and means on the rearmost portions of said conveyer members movably engaging said inclined tracks for imparting substantially vertical movement to said rear ends of said conveyer members.

References Cited by the Examiner
UNITED STATES PATENTS

| | | |
|---|---|---|
| 1,911,106 | 5/33 | Camerota. |
| 2,674,760 | 4/54 | Finch. |
| 2,856,080 | 10/58 | Mitchell _____ 221—277 X |

FOREIGN PATENTS

| | | |
|---|---|---|
| 301,064 | 1/29 | Great Britain. |
| 667,892 | 3/52 | Great Britain. |
| 587,777 | 1/59 | Italy. |

HUGO O. SCHULZ, *Primary Examiner.*